United States Patent
DeGeorge

(10) Patent No.: US 9,046,021 B2
(45) Date of Patent: Jun. 2, 2015

(54) EXHAUST TREATMENT REGENERATION CONTROL SYSTEM

(71) Applicant: Tenneco Automotive Operating Company Inc., Lake Forest, IL (US)

(72) Inventor: John W. DeGeorge, Michigan Center, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 11 days.

(21) Appl. No.: 13/910,626

(22) Filed: Jun. 5, 2013

(65) Prior Publication Data

US 2014/0364301 A1  Dec. 11, 2014

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *B01J 38/04* | (2006.01) |
| *F01N 9/00* | (2006.01) |
| *F01N 3/025* | (2006.01) |

(52) U.S. Cl.
CPC .............. *F01N 3/206* (2013.01); *B01J 38/04* (2013.01); *Y02T 10/26* (2013.01); *Y02T 10/47* (2013.01); *F01N 9/002* (2013.01); *F01N 3/0253* (2013.01); *F01N 2610/03* (2013.01); *F01N 2900/0411* (2013.01); *F01N 2900/1602* (2013.01)

(58) Field of Classification Search
CPC ........ F01N 3/021; F01N 3/025; F01N 3/0253
USPC ........... 60/274, 276, 277, 286, 295, 297, 303, 60/311
See application file for complete search history.

(56) References Cited

U.S. PATENT DOCUMENTS

| | | | |
|---|---|---|---|
| 5,193,340 A * | 3/1993 | Kamihara ....................... | 60/286 |
| 6,622,480 B2 | 9/2003 | Tashiro et al. | |
| 6,973,778 B2 | 12/2005 | Kondou et al. | |
| 7,047,729 B2 * | 5/2006 | van Nieuwstadt et al. ..... | 60/286 |
| 7,134,275 B2 * | 11/2006 | Tsutsumoto et al. ........... | 60/295 |
| 7,263,825 B1 * | 9/2007 | Wills et al. ...................... | 60/295 |
| 7,412,822 B2 | 8/2008 | Zhan et al. | |
| 7,587,893 B2 | 9/2009 | Winsor | |
| 7,891,174 B2 | 2/2011 | Gioannini et al. | |
| 8,020,372 B2 | 9/2011 | Mullins et al. | |
| 8,245,501 B2 | 8/2012 | He et al. | |
| 8,265,852 B2 | 9/2012 | Yanakiev et al. | |
| 2005/0103002 A1 | 5/2005 | Kondou et al. | |
| 2007/0266701 A1 | 11/2007 | Cheng | |

FOREIGN PATENT DOCUMENTS

| | | |
|---|---|---|
| EP | 1 591 635 | 3/2009 |
| EP | 2 031 217 | 4/2011 |

* cited by examiner

*Primary Examiner* — Thomas Denion
*Assistant Examiner* — Diem Tran
(74) *Attorney, Agent, or Firm* — Harness, Dickey & Pierce, P.L.C.

(57) ABSTRACT

A system and method for controlling the regeneration of an exhaust gas particulate filter. When regeneration is initiated, an outlet temperature of an exhaust gas oxidation catalyst and an outlet temperature of the exhaust gas particulate filter are detected. As part of a closed loop non-linear temperature targeting regime, the maximum of the outlet temperature of the exhaust gas oxidation catalyst and the outlet temperature of the exhaust gas particulate filter is set as a reference temperature. A regeneration temperature target is initialized and indexed based on a profile time and the reference temperature. As part of a closed loop fuel control regime at least one hydrocarbon dosing value is determined based on an exhaust mass flow, the reference temperature, and the regeneration temperature target.

26 Claims, 4 Drawing Sheets

EXHAUST TREATMENT REGENERATION CONTROL SYSTEM

FIELD

The present disclosure relates to a system and a method for controlling the regeneration of an exhaust gas particulate filter such as a diesel particulate filter (DPF). More particularly, the present disclosure relates to a system and a method for managing filter regeneration using closed loop non-linear temperature targeting and fuel control.

BACKGROUND

Exhaust gas particulate filters have become common place emissions control equipment in many of today's vehicles and especially in vehicles powered by compression ignition engines. Exhaust gas particulate filters, frequently referred to as a diesel particulate filters (DPF) when used to control the emissions of a compression ignition diesel engine, are typically mounted in fluid communication with a vehicle's exhaust system. The exhaust gas particulate filter functions to remove unburned hydrocarbons or soot from the exhaust gas passing through the exhaust system before it exits the exhaust system and enters the environment. The soot that is removed from the exhaust gas by the exhaust gas particulate filter is trapped within a housing of the exhaust gas particulate filter. Over time, this soot builds up and must be removed. Rather than requiring dealer maintenance of the exhaust gas particulate filter and physical cleaning out of the housing, exhaust aftertreatment systems have been developed that elevate the temperature of the exhaust in the exhaust gas particulate filter such that the soot can burn off. These systems are commonly described as providing particulate filter regeneration through the burn off and attendant removal of soot.

Exhaust gas temperatures in the exhaust gas particulate filter can be raised through the injection of hydrocarbon fuel into the exhaust system or the exhaust gas particulate filter itself. The hydrocarbon fuel that is injected into the exhaust gas ignites raising the temperature of the exhaust gas to a temperature where the soot can burn off, pass through the exhaust gas particulate filter, and exit the exhaust system. Electronic control systems may be used to control a hydrocarbon injection system, which may also be referred to as a hydrocarbon doser. However, such electronic control systems and the methods or regimes they execute tend to be slow to react to changing exhaust gas temperatures leading to poor particulate filter regeneration that is longer than necessary and that consumes excessive hydrocarbon fuel. Temperature overshoots are also common where the exhaust gas temperature exceeds a target temperature set by the electronic control system. These temperature overshoots can cause a shut off of the hydrocarbon dosing, which creates a large temperature undershoot characterized by rapid cooling of the particulate filter catalyst. The rapid cooling can crack the particulate filter catalyst and leads to additional delays in achieving complete filter regeneration because the exhaust gas particulate filter must again be brought up to a designated regeneration temperature zone. Moreover, electronic control systems fail to account for partial regeneration events where regeneration has been interrupted due to exhaust gas temperatures falling above or below the designated regeneration temperature zone.

SUMMARY

Generally, the present disclosure provides for a system and a method for controlling the regeneration of an exhaust gas particulate filter using closed loop non-linear temperature targeting and fuel control.

In one form, the present disclosure provides a system comprising an exhaust gas particulate filter and an exhaust gas oxidation catalyst in fluid communication with the exhaust gas particulate filter. A hydrocarbon injector supplies a dose of hydrocarbon fuel to the exhaust gas particulate filter to facilitate regeneration. A regeneration management module controls the hydrocarbon injector and thereby controls regeneration of the exhaust gas particulate filter. The regeneration management module receives signals indicating an outlet temperature of the exhaust gas oxidation catalyst and an outlet temperature of the exhaust gas particulate filter. The regeneration management module sets a reference temperature as one of the outlet temperature of the exhaust gas oxidation catalyst and the outlet temperature of the exhaust gas particulate filter. The regeneration management module also initializes a regeneration temperature target by indexing the regeneration temperature target based on a profile time and the reference temperature. The regeneration management module then determines the dose of hydrocarbon fuel based on the regeneration temperature target.

In another form, the system includes a regeneration triggering module that generates a regeneration trigger state signal. The regeneration trigger state signal identifies whether regeneration of the exhaust gas particulate filter has been demanded by the system. The system also includes a hydrocarbon injection diagnostics and system enable module that generates a hydrocarbon injection enable state signal. The hydrocarbon injection enable state signal identifies whether hydrocarbon dosing can be supplied to the exhaust gas particulate filter. A regeneration management module, in communication with the regeneration triggering module and the hydrocarbon injection diagnostics and system enable module, receives the regeneration trigger state signal from the regeneration triggering module and the hydrocarbon injection enable state signal from the hydrocarbon injection diagnostics and system enable module. The regeneration management module is programmed with a closed loop non-linear temperature targeting regime and a closed loop fuel control regime.

The disclosure also provides a method for controlling regeneration of an exhaust gas particulate filter. The method includes initiating regeneration of an exhaust gas particulate filter and detecting an outlet temperature of an exhaust gas oxidation catalyst, an inlet temperature of the exhaust gas oxidation catalyst, and an outlet temperature of the exhaust gas particulate filter. The maximum of the outlet temperature of the exhaust gas oxidation catalyst, the inlet temperature of the exhaust gas oxidation catalyst, and the outlet temperature of the exhaust gas particulate filter is set as a reference temperature. A regeneration temperature target is initialized and the regeneration temperature target is indexed based on a profile time and the reference temperature. The method further includes determining at least one hydrocarbon dosing value based on an exhaust mass flow, the reference temperature, and the regeneration temperature target.

Accordingly, the systems and methods disclosed herein achieve several advantages. By linking closed loop non-linear temperature targeting and fuel control regimes, the systems and the methods provided herein account for and react quickly to changing exhaust gas temperatures. Particularly, by indexing the regeneration temperature target according to a profile time and a reference temperature set as one of the inlet temperature of the exhaust gas oxidation catalyst, the outlet temperature of the exhaust gas oxidation catalyst, and the outlet temperature of the exhaust gas particulate filter, the closed loop non-linear temperature targeting regime can respond quickly to changes in exhaust gas temperature. This minimizes particulate filter regeneration time and correspondingly reduces the amount of hydrocarbon fuel consumed by the regeneration process. The closed loop non-linear temperature targeting also reduces hydrocarbon fuel usage because the regeneration temperature target can be indexed beyond a predetermined regeneration zone and can provide regeneration at lower exhaust temperatures without quenching the particulate filter catalyst.

The systems and methods disclosed herein also mitigate against temperature overshoots by setting the reference temperature as the maximum of the inlet temperature of the exhaust gas oxidation catalyst, the outlet temperature of the exhaust gas oxidation catalyst, and the outlet temperature of the exhaust gas particulate filter. This provides for more consistent hydrocarbon dosing that prevents rapid cooling of the exhaust gas particulate filter which can crack the particulate filter catalyst and lead to additional delays in achieving complete filter regeneration. By determining whether an interruption in regeneration has occurred, the disclosed systems and methods also account for partial regeneration events where regeneration has been interrupted due to exhaust gas temperatures falling above or below the designated regeneration temperature zone. In response to detecting such a regeneration interruption, the system and method disclosed herein can adjust the time period for the next regeneration cycle based on an observed partial regeneration event.

DRAWINGS

These and other features and advantages of the present disclosure will be readily appreciated, as the same becomes better understood by reference to the following detailed description when considered in connection with the accompanying drawings. These drawings are for illustrative purposes of only select embodiments and not all possible implementations and are not intended to limit the scope of the present disclosure, wherein.

DETAILED DESCRIPTION

Figure 1:
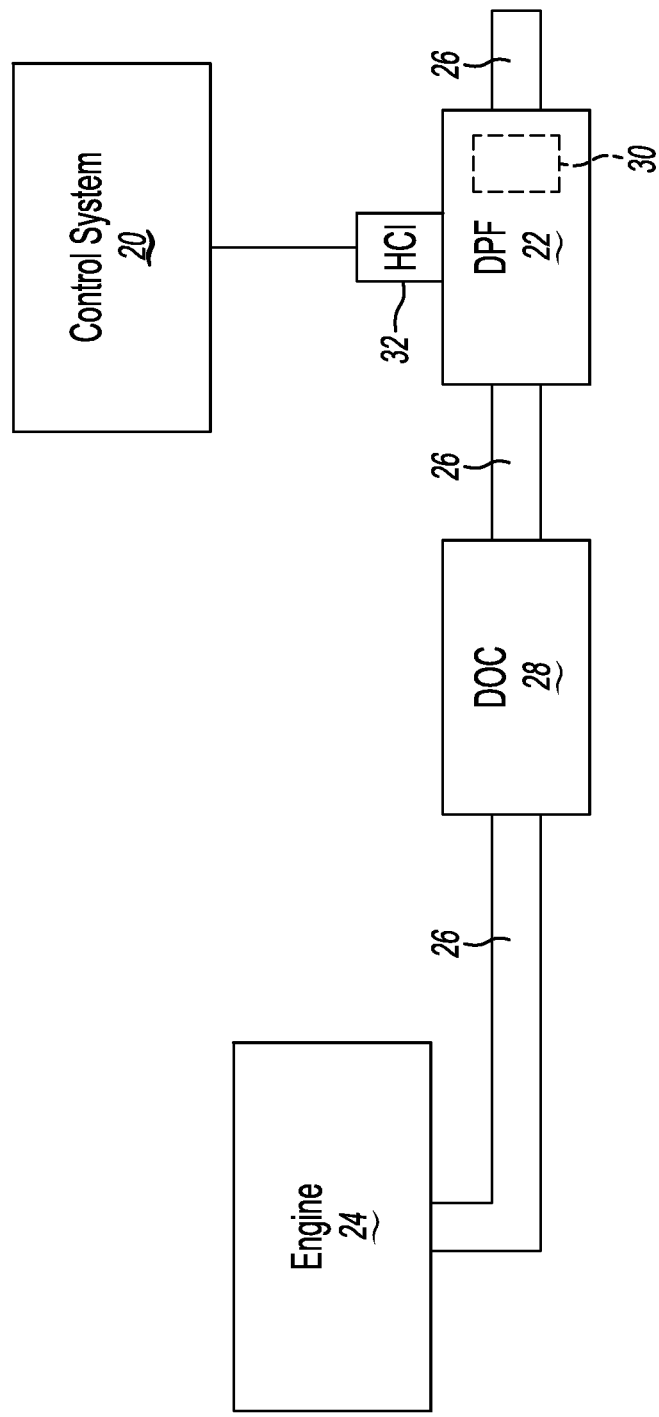
FIG. 1 is a block diagram of an engine and exhaust system including an exemplary regeneration control system described by the present disclosure.

Referring to the Figures, wherein like numerals indicate corresponding parts throughout the several views, a system 20 for managing the regeneration of an exhaust gas particulate filter 22 is provided. As illustrated in FIG. 1, the system 20 generally controls the emissions of an internal combustion engine 24. It should be appreciated that the internal combustion engine 24 may take a variety of forms including a compression ignition engine or a spark ignition engine. An exhaust system 26 is generally connected in fluid communication with the internal combustion engine 24 to transport exhaust gas away from the internal combustion engine 24. An oxidation catalyst 28 may be placed in fluid communication with the exhaust system 26 for providing emissions control by removing pollutants such as carbon monoxide and nitrogen oxides from the exhaust gas passing through the exhaust system 26. It should be appreciated that where the engine 24 is a compression ignition engine, such as a diesel engine, the oxidation catalyst 28 may be a diesel oxidation catalyst (DOC). The exhaust gas particulate filter 22 may also be placed in fluid communication with the exhaust system 26 for providing emissions control by removing pollutants including unburned hydrocarbons, such as soot, from the exhaust gas passing through the exhaust system 26. It should be appreciated that where the engine 24 is a compression ignition engine, such as a diesel engine, the exhaust gas particulate filter 22 may be a diesel particulate filter (DPF). It should also be appreciated that the arrangement of the oxidation catalyst 28 and the exhaust gas particulate filter 22 may vary with respect to proximity to the engine 24. In some arrangements, the oxidation catalyst 28 may be closer to the engine 24 than the exhaust gas particulate filter 22 and in other arrangements the oxidation catalyst 28 may be further from the engine 24 than the exhaust gas particulate filter 22. Also, multiple oxidation catalysts 28 and exhaust gas particulate filters 22 may be employed.

Still referring to FIG. 1, the exhaust gas particulate filter 22 may have a particulate filter catalyst 30 that acts as an oxidizer. Generally, the particulate filter catalyst 30 is a solid material disposed in the exhaust system 26 such as, for example, a coating that reduces nitrogen dioxide or NOx emissions. A hydrocarbon injector 32 may be placed in fluid communication with the exhaust gas particulate filter 22. The hydrocarbon injector 32 may directly inject a hydrocarbon dose, such as unburned fuel, directly into the particulate filter 22 or into the exhaust system 26 adjacent the particulate filter 22. The hydrocarbon dose that is injected into the exhaust gas particulate filter 22 or the exhaust system 26 interacts with the particulate filter catalyst 30 to increase the exhaust gas temperature during regeneration to burn soot that has collected in the exhaust gas particulate filter 22. The system 20 is operable to control the operation of the hydrocarbon injector 32 and optionally the engine 24 to manage regeneration of the exhaust gas particulate filter 22. It should be noted that special use of the term hydrocarbon is made herein such that the term hydrocarbon refers generally any combustible medium including all fuels and dosing agents that may be used in exhaust aftertreatment systems. Such fuels and dosing agents, including alcohol for example, may or may not be comprised of hydrogen and carbon chains but shall still fall under the definition of hydrocarbon as the term is used herein. Thus the hydrocarbon injector 32 that supplies a hydrocarbon dose to the exhaust system 26 is not limited by the term hydrocarbon and generally refers to an injector that supplies any combustible medium to the exhaust system 26.

Figure 2:
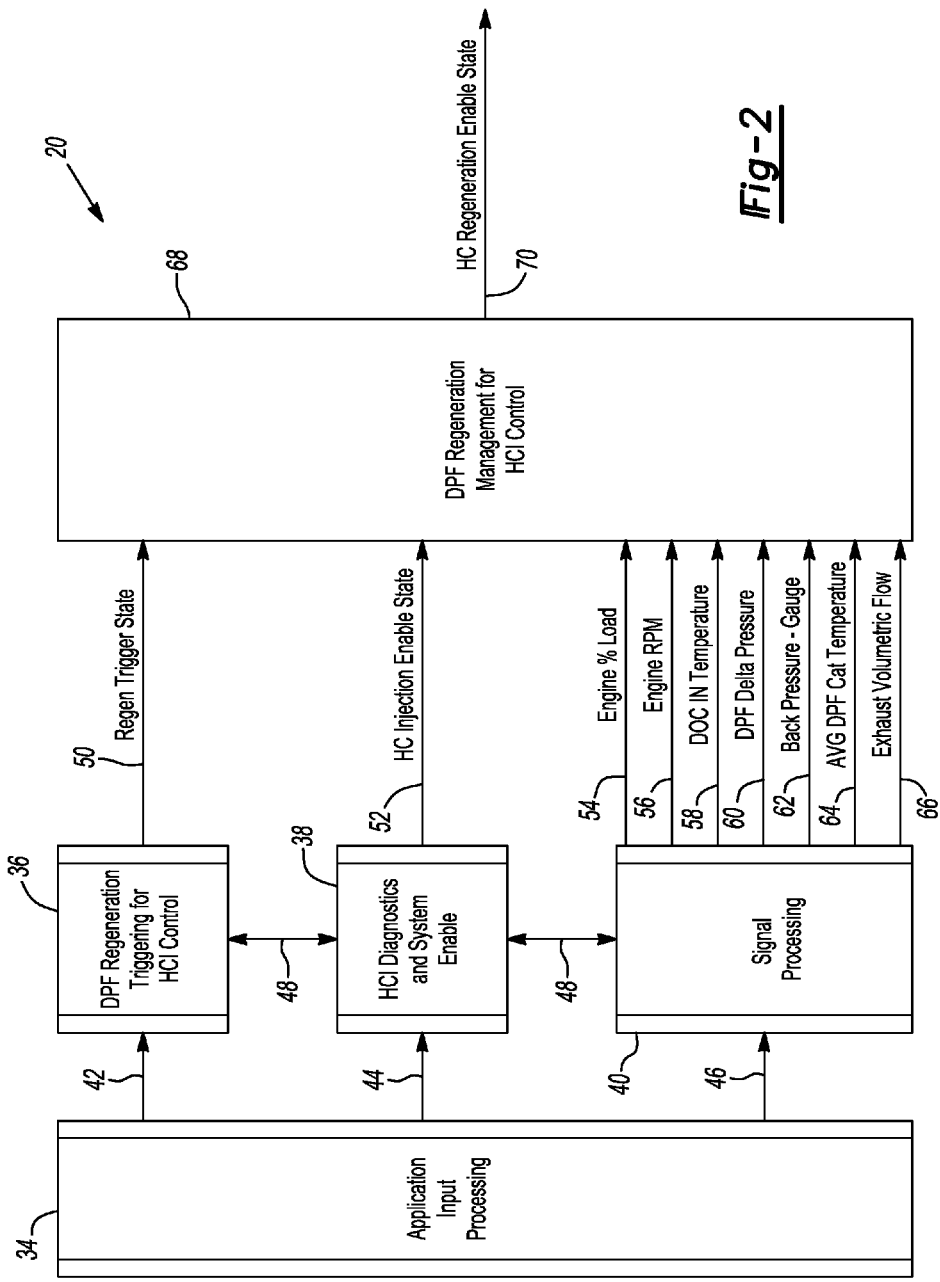
FIG. 2 is a block diagram of the exemplary regeneration control system illustrating modules of the exemplary regeneration control system and their respective input signals and output signals.

As illustrated in FIG. 2, the system 20 includes an application input processing module 34 for processing application input signals. This includes calculating inferred signals from other measured signals. The system also includes a regeneration triggering module 36, a hydrocarbon injection diagnostics and system enable module 38, and a signal processing module 40. The application input processing module 34 communicates with the regeneration triggering module 36, the hydrocarbon injection diagnostics and system enable module 38, and the signal processing module 40 by sending input signals 42, 44, 46 to the regeneration triggering module 36, the hydrocarbon injection diagnostics and system enable module 38, and the signal processing module 40. The regeneration triggering module 36 and the hydrocarbon injection diagnostics and system enable module 38 communicate with one another by sending and receiving transfer signals 48 between one another. Similarly, the signal processing module 40 and the hydrocarbon injection diagnostics and system enable module 38 communicate with one another by sending and receiving transfer signals 48 between one another. The transfer signals 48 may be, but are not limited to, signals indicating trigger status, system ready status, system faults, and regeneration inhibits.

The regeneration triggering module 36 receives at least a first input signal 42 from the application input processing module 34 and generates a regeneration trigger state signal 50 in response. By way of example, the a first input signal 42 may be, but is not limited to, a signal indicating soot load accumulation, delta pressure, back pressure, or time spent between regenerations. The regeneration trigger state signal 50 identifies whether the system 20 is calling for regeneration of the exhaust gas particulate filter 22. The hydrocarbon injection diagnostics and system enable module 38 receives at least a second input signal 44 from the application input processing module 34 and generates a hydrocarbon injection enable state signal 52 in response. The hydrocarbon injection enable state signal 52 identifies whether hydrocarbon injection is enabled. By way of example, the a second input signal 44 may be, but is not limited to, a signal indicating maximum and minimum exhaust temperature, fuel status, engine speed and load, or exhaust flow.

The signal processing module 40 receives at least a third input signal 46 from the application input processing module 34 and generates a plurality of operating parameter signals 54, 56, 58, 60, 62, 64, 66 in response. By way of example, the a third input signal 46 may be, but is not limited to, a signal indicating exhaust temperature, exhaust pressure, engine speed, intake air flow, and fuel flow. Thus, the third input signal 46 may be measured and/or calculated the engine 24 or the system 20. The plurality of operating parameter signals 54, 56, 58, 60, 62, 64, 66 include at least an engine percent load signal 54, an engine RPM signal 56, an oxidation catalyst inlet temperature signal 58, a particulate filter delta pressure signal 60, an exhaust back pressure signal 64, an average particulate filter catalyst temperature signal 64, and an exhaust volumetric flow signal 66. The engine percent load signal 54 represents a percentage of the mechanical load that is currently being experienced by the engine 24. The engine percent load signal 54 ranges between full load at one hundred percent and no load at zero percent. It should be appreciated that full load conditions may be experienced when driving uphill or during acceleration and no load conditions may be experienced when driving downhill or during deceleration. It should also be appreciated that the engine percent load signal 54 may be represented as a fraction or decimal value ranging between zero and one. The engine RPM signal 56 represents the current rotational operating speed of the engine 24 as measured, for example, in units of revolutions per minute (RPM). The oxidation catalyst inlet temperature signal 58 represents the temperature of the exhaust gas entering the inlet of the oxidation catalyst 28. It should be appreciated that the oxidation catalyst inlet temperature signal 58 may be either measured or estimated. It should also be appreciated that the oxidation catalyst inlet temperature signal 58 may be represented as a variety of different units including, for example, degrees Celsius (C) or degree Fahrenheit (F).

The particulate filter delta pressure signal 60 represents a pressure difference between the exhaust gas entering the exhaust gas particulate filter 22 and the exhaust gas exiting the exhaust gas particulate filter 22. It should be appreciated that the particulate filter delta pressure signal 60 may be either measured or estimated. It should also be appreciated that the particulate filter delta pressure signal 60 may be represented as a variety of different units including, for example, kilopascal (kPa). The exhaust back pressure signal 62 represents a pressure opposing or resisting the flow of the exhaust gas through the exhaust system 26 including exhaust flow through the oxidation catalyst 28 and the exhaust gas particulate filter 22. It should be appreciated that the exhaust back pressure signal 62 may be either measure or estimated and represented as a variety of different units including, for example, kilopascal (kPa).

The average particulate filter catalyst temperature 64 signal represents the temperature of the particulate filter catalyst 30 averaged along its length. It should also be appreciated that the average particulate filter catalyst temperature signal 64 may be either measured or estimated and represented as a variety of different units including, for example, degrees Celsius (C) or degree Fahrenheit (F). The exhaust volumetric flow signal 66 represents the volume flow rate of the exhaust gas traveling through the exhaust system 26. It should be appreciated that the exhaust volumetric flow signal 66 may be either measured or estimated and represented as a variety of different units including, for example, liters per hour (LPH).

The system further includes a regeneration management module 68 in communication with the regeneration triggering module 36, the hydrocarbon injection diagnostics and system enable module 38, and the signal processing module 40. More particularly, the regeneration management module 68 receives the regeneration trigger state signal 50 from the regeneration triggering module 36 and the regeneration management module 68 receives the hydrocarbon injection enable state signal 52 from the hydrocarbon injection diagnostics and system enable module 38. Similarly, the regeneration management module 68 receives the engine percent load signal 54, the engine RPM signal 56, the oxidation catalyst inlet temperature signal 58, the particulate filter delta pressure signal 60, the exhaust back pressure signal 62, the average particulate filter catalyst temperature signal 64, and the exhaust volumetric flow signal 66 from the signal processing module 40. In response to receiving these signals from the regeneration triggering module 36, the hydrocarbon injection diagnostics and system enable module 38, and the signal processing module 40, the regeneration management module 68 generates a hydrocarbon regeneration enable state signal 70 by executing a closed loop temperature targeting regime and a closed loop fuel control regime that is linked with the closed loop temperature targeting regime. The closed loop temperature targeting regime and the closed loop fuel control regime that are executed by the regeneration management module 68 are explained in further detail below. It should be appreciated that one or more of the regeneration management module 68, the regeneration triggering module 36, the hydrocarbon injection diagnostics and system enable module 38, and the signal processing module 40 may have nonvolatile random access memory (NVRAM) for storing information relating to the method set forth below and/or the signals described above. The NVRAM may also be used to store the total number of complete regenerations and the total number of regeneration interruptions for use as a diagnostic tool.

In this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

Figure 3A:
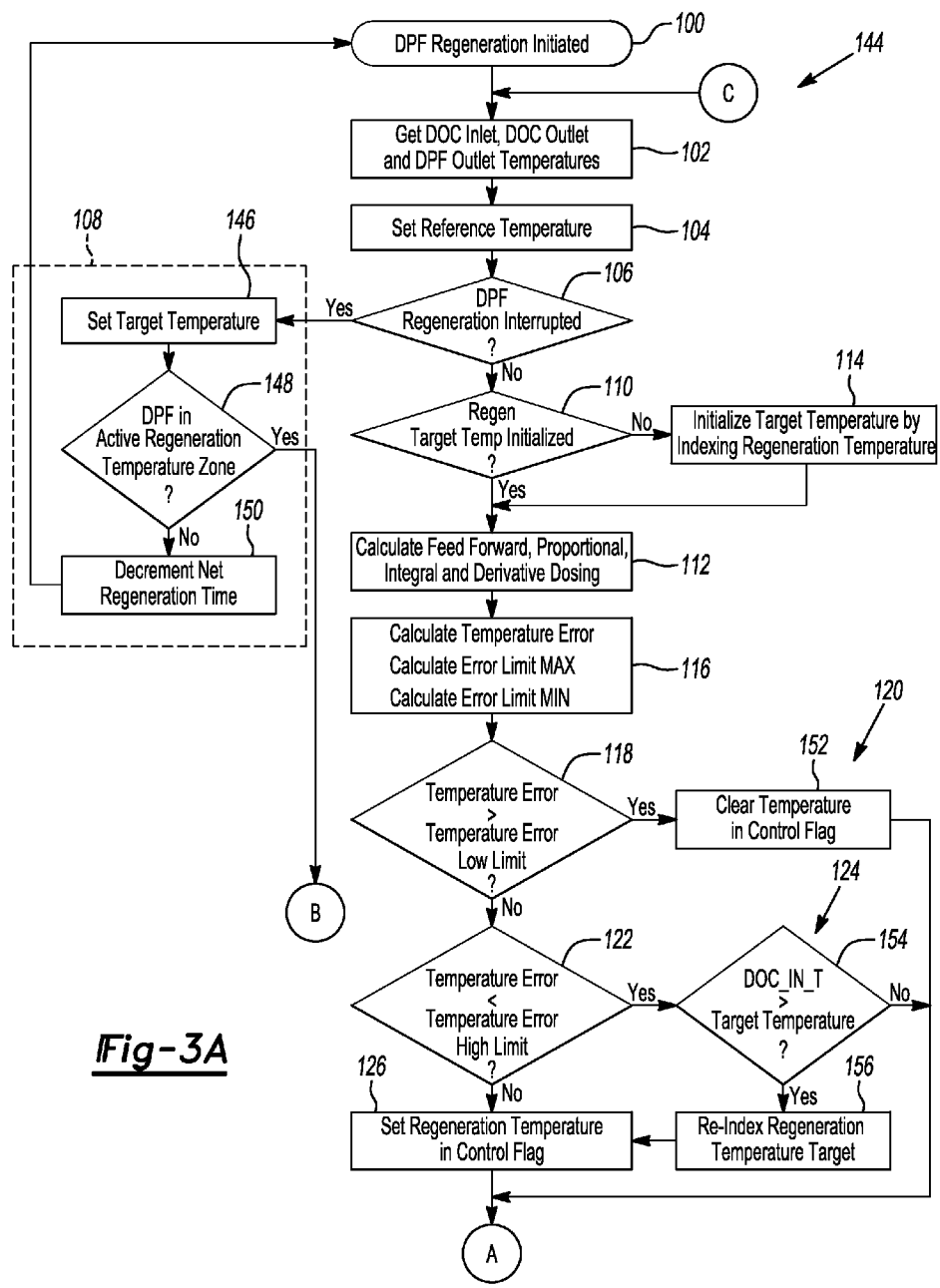
FIG. 3A is a flow diagram illustrating the steps of an exemplary method for using the exemplary regeneration control system described by the present disclosure.
Figure 3B:
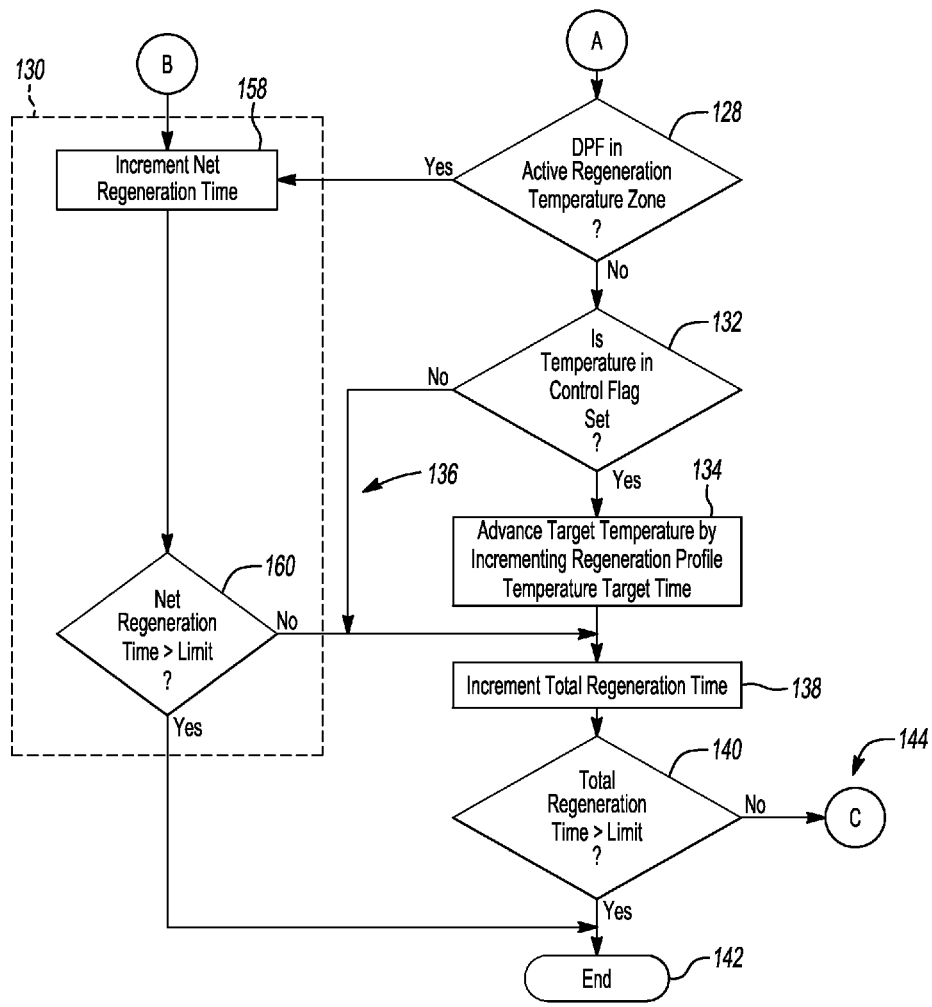
FIG. 3B is a continuation of the flow diagram of FIG. 3A and illustrates the steps of the exemplary method for using the exemplary regeneration control system described by the present disclosure.

Now referring to FIGS. 3A and 3B, a flow diagram is depicted illustrating the steps of a method for managing the regeneration of an exhaust gas particulate filter. In step 100 regeneration of the exhaust gas particulate filter is initiated. In response to regeneration being initiated, the method in step 102 detects an inlet temperature of an exhaust gas oxidation catalyst, an outlet temperature of the exhaust gas oxidation catalyst, and an outlet temperature of the exhaust gas particulate filter. As noted above, these temperatures can be either measured or estimated (i.e. modeled). Next, the method in step 104 sets a reference temperature as the maximum of either the inlet temperature of the exhaust gas oxidation catalyst, the outlet temperature of the exhaust gas oxidation catalyst, and the outlet temperature of the exhaust gas particulate filter. The reference temperature is then used by the closed loop fuel control regime to regulate the amount of hydrocarbon dosing supplied to the exhaust gas particulate filter 22, thus acting to link the closed loop temperature targeting regime with the closed loop fuel control regime. Setting the reference temperature as the maximum of the inlet temperature of the exhaust gas oxidation catalyst, the outlet temperature of the exhaust gas oxidation catalyst, and the outlet temperature of the exhaust gas particulate filter mitigates temperature overshoots where the exhaust gas temperature exceeds a target temperature set by the open loop control system. The disclosed method is advantageous because temperature overshoots can cause a shut off of the hydrocarbon dosing which creates a large temperature undershoot with rapid cooling of the particulate filter catalyst 30. This rapid cooling can crack the particulate filter catalyst 30 in addition to delaying and lengthening the regeneration process which leads to increased fuel consumption.

The method at step 106 determines whether regeneration has been interrupted. A regeneration interruption is defined as any time regeneration is triggered and hydrocarbon dosing is not enabled. Accordingly, step 106 analyzes the regeneration trigger signal 50 generated by the regeneration triggering module 36 and the hydrocarbon injection enable state signal 52 generated by the hydrocarbon injection diagnostics and system enable module 38 to determine whether regeneration has been triggered and whether hydrocarbon dosing is enabled. In response to determining that regeneration has been interrupted, the method proceeds to a regeneration interruption feedback loop 108. Alternatively, in response to determining that regeneration has not been interrupted, the method proceeds to step 110 of determining whether a regeneration temperature target has been initialized. In response to determining that the regeneration temperature target has been initialized, the method proceeds to step 112 of executing a closed loop fuel control regime by calculating proportional, integral, and derivative hydrocarbon dosing values based on an exhaust mass flow, the reference temperature, and the regeneration temperature target. These hydrocarbon dosing values represent an amount or mass of hydrocarbon fuel to be injected into the exhaust gas particulate filter 22 to control regeneration as part of the closed loop fuel control regime. Alternatively, in response to determining that the regeneration temperature has not been initialized, the method first proceeds to step 114 of initializing the regeneration temperature target. In step 114, the regeneration temperature target is initialized by indexing a regeneration temperature target based on a calibration curve generated using a profile time and the reference temperature. In response to initializing the regeneration temperature target, the method then proceeds to step 112. Accordingly, step 110 begins the closed loop temperature targeting regime.

It should be appreciated that in open loop temperature targeting regimes, the target temperatures are set according to the predetermined linear temperature ramp or linear temperature curve that does not extend beyond a predetermined regeneration temperature zone (i.e. the range of temperatures where soot may be burned off). By contrast, the closed loop temperature targeting regime of the present disclosure is dynamic and allows the regeneration temperature target to be indexed beyond the predetermined regeneration temperature zone. Advantageously, this allows the method to automatically find the minimum regeneration temperature target leading to an attendant reduction in hydrocarbon dosing and fuel savings. In other words, the method creates self-regulating temperature targeting and fuel control that expands the regeneration temperature range at low exhaust gas temperatures without quenching the particulate filter catalyst 30. The closed loop temperature targeting regime also eliminates the waiting period, or delay, associated with open loop temperature targeting. In open loop temperature targeting the target temperature is ramped up linearly with time. If the engine 24 is subject to an increased load, such as during acceleration, the exhaust gas temperature my rise above the target temperature called for by the open loop system requiring time to pass before the target temperature catches up with the higher exhaust gas temperature. This wastes regeneration time and fuel. The closed loop temperature targeting regime disclosed eliminates such delays by indexing the regeneration temperature target according to the profile time and the reference temperature. The profile time is generated by a profile timer configured to count up from zero and ramp up the regeneration temperature target as a function of time. Meanwhile, the reference temperature is set to equal the maximum of the oxidation catalyst outlet temperature and the particulate filter outlet temperature in step 104. Accordingly, the closed loop temperature targeting regime disclosed accounts for engine induced rises in the exhaust gas temperature. If a rise in the exhaust gas temperature occurs for any reason, the closed loop temperature targeting regime automatically bumps up the regeneration temperature target to a temperature that is at or above the higher exhaust gas temperature.

In step 116, the method includes calculating a temperature error, a temperature error low limit, and a temperature error high limit. The temperature error is calculated by subtracting the reference temperature from the regeneration temperature target. The temperature error low limit is calculated by multiplying the regeneration temperature target by a predetermined minimum limit factor. The temperature error high limit is calculated by multiplying the regeneration temperature target by a predetermined maximum limit factor. In response to calculating the temperature error, the temperature error low limit, and the temperature error high limit the method proceeds to step 118 of determining whether the temperature error is greater than the temperature error low limit. In response to the temperature error being greater than the temperature error low limit, the method proceeds to a low error limit feed forward loop 120. In response to the temperature error being less than or equal to the temperature error low limit, the method proceeds to step 122 of determining whether the temperature error is less than the temperature error high limit. In response to the temperature error being less than the temperature error high limit, the method proceeds to a high error limit feed forward loop 124. In response to the temperature error being greater than or equal to the temperature error high limit, the method proceeds to step 126 of setting the regeneration temperature target in a control flag.

The predetermined minimum limit factor and the predetermined maximum limit factor used in the calculations of step 116 are determined empirically and are proportional to the regeneration temperature target. More specifically, they are determined by look-up tables. By way of example, the look-up tables may look like the flowing:
Regeneration Temperature Target: [200 300 400 600 700]
Minimum Limit Factor: [−0.1−0.15−0.2−0.1−0.05]
Regeneration Temperature Target: [200 300 400 600 700]
Maximum Limit Factor: [0.1 0.15 0.2 0.1 0.05]

With reference to steps 110 through 126 of the method, the closed loop fuel control regime includes calculating the proportional hydrocarbon dosing value using a look up table that is a function of the temperature error multiplied by a value from a second look up table that is a function of the exhaust mass flow. The closed loop fuel control regime also includes calculating the integral hydrocarbon dosing value using a third look up table that is a function of the temperature error divided by a gain factor. For example, the temperature error may be divided by a gain factor such as ten multiplied by a value from a fourth look up table that is a function of the exhaust mass flow. The integral hydrocarbon dosing value calculation occurs at a calibrated rate of time. The maximum and minimum integral hydrocarbon dosing value is bounded by the result of the product of a calibrated percentage of the feed forward term. The integral hydrocarbon dosing value is reset when the regeneration is initiated, provided that hydrocarbon injection conditions are met or if the temperature error exceeds calibrated limits. The closed loop fuel control regime also includes calculating the derivative hydrocarbon dosing value by multiplying the derivative gain by an acceleration of the error (i.e. an error rate). The derivative hydrocarbon dosing value is determined from a fifth look up table that is a function of the error rate. The derivative hydrocarbon dosing value is limited by a maximum and minimum in a similar fashion as the integral hydrocarbon dosing value. As such, it should be appreciated that the closed loop fuel control regime is always a closed loop as distinguished from using only a limited period of feed forward control. Each feedback term in the closed loop fuel control regime is clipped to a maximum or minimum level.

In step 128, the method further includes determining whether the exhaust gas particulate filter 22 is in an active regeneration temperature zone by detecting the average particulate filter catalyst temperature. In response to the average particulate filter catalyst temperature being within the active regeneration temperature zone, the method proceeds to a net regeneration time feed forward loop 130. In response to the average particulate filter catalyst temperature being above or below the active regeneration temperature zone, the method proceeds step 132 of determining whether the control flag is set with the regeneration temperature target pursuant to step 126. In response to the control flag having the regeneration temperature target set by step 126, the method proceeds to step 134 of advancing the regeneration temperature target by incrementing a regeneration profile temperature target time defined as the sum of the profile time and the value one. In response to the regeneration temperature target being absent from the control flag, the method proceeds to a control flag feed forward loop 136.

In step 138, the method proceeds with incrementing a total regeneration time. The total regeneration time may be defined as the amount of time that is spent by the system 20 in trying to complete a regeneration. In other words, the total regeneration time is the time period between when regeneration has been triggered and when regeneration is complete. In response to incrementing the total regeneration time, the method continues with step 140 of determining whether the total regeneration time is greater than a predetermined total regeneration time limit. In response to the total regeneration time being greater than the predetermined total regeneration time limit, the method proceeds to step 142 of identifying a complete regeneration and deactivating regeneration of the exhaust gas particulate filter. In response to the total regeneration time being less than or equal to the predetermined total regeneration time limit, the method proceeds to a reiterative feedback loop 144. The reiterative feedback loop 144 calls for repeating the disclosed method by returning to step 102 of detecting the oxidation catalyst inlet temperature, the oxidation catalyst outlet temperature, and the particulate filter outlet temperature.

The regeneration interruption feedback loop 108 is executed in response to determining that regeneration has been interrupted in accordance with step 106. The regeneration interruption feedback loop 108 includes step 146 of setting the regeneration temperature target as the reference temperature. The regeneration interruption feedback loop 108 proceeds with step 148 of determining whether the exhaust gas particulate filter is in the active regeneration temperature zone by on detecting the average particulate filter catalyst temperature. In response to the average particulate filter catalyst temperature being within the active regeneration temperature zone, the method proceeds to the net regeneration time feed forward loop 130. In response to the average particulate filter catalyst temperature being outside of (i.e. above or below) the active regeneration temperature zone, the method proceeds step 150 of decrementing a net regeneration time based on the average particulate filter catalyst temperature. The net regeneration time may be defined as the time required to completely burn off soot in the exhaust gas particulate filter 22 at a given temperature. In other words, the net regeneration time is the time spent with the particulate filter catalyst 30 in the active regeneration temperature zone. The net regeneration time is decremented based on a calibration table that is a function of the average particulate filter temperature. The calibration rate ranges from 0.5 to 1.5 and commences whenever regeneration has been triggered but the average particulate filter catalyst temperature is not within the active regeneration temperature zone. Accordingly, the cooler the average particulate filter catalyst temperature becomes the faster the decrement will be.

In response to decrementing the net regeneration time, the regeneration interruption feedback loop 108 proceeds to call for repeating the disclosed method by returning to step 100 of initiating regeneration of the exhaust gas particulate filter 22.

Accordingly, the net regeneration time spent in the active regeneration temperature zone is adjusted as a function of the average particulate filter catalyst temperature if an interruption in regeneration occurs. By adjusting the net regeneration time, the method provides for a shortened regeneration event during the next regeneration cycle allowing for fuel savings.

The low error limit feed forward loop 120 is executed in response to the temperature error being greater than the temperature error low limit. The low error limit feed forward loop 120 includes step 152 of clearing the regeneration temperature target in the control flag. In other words, the low error limit feed forward loop 120 calls for holding the regeneration temperature target that was calculated previously in response to the regeneration temperature target in the control flag being set in a prior loop. In response to clearing any regeneration temperature target set in the control flag, the low error limit feed forward loop 120 proceeds by returning to step 128 of determining whether the exhaust gas particulate filter 22 is in an active regeneration temperature zone.

The high error limit feed forward loop 124 is executed in response to the temperature error being less than the temperature error high limit. The high error limit feed forward loop 124 includes step 154 of determining whether the oxidation catalyst inlet temperature is greater than the regeneration temperature target. In response to the oxidation catalyst inlet temperature being greater than the regeneration temperature target, the high error limit feed forward loop 124 proceeds to step 156 of re-indexing the regeneration temperature target based on the profile time and the reference temperature. The high error limit feed forward loop 124 then returns to step 126 of setting the regeneration temperature target in the control flag. In response to the oxidation catalyst inlet temperature being less than or equal to the regeneration temperature target, the high error limit feed forward loop 124 joins a portion of the low error limit feed forward loop 120 and proceeds to step 152 of clearing any regeneration temperature target set in the control flag and then returns to step 128 of determining whether the exhaust gas particulate filter 22 is in an active regeneration temperature zone.

The net regeneration time feed forward loop 130 is executed in response to the average particulate filter catalyst temperature being within the active regeneration temperature zone. The net regeneration time feed forward loop 130 includes step 158 of incrementing the net regeneration time based on the average particulate filter catalyst temperature. The net regeneration time is incremented based on a calibration table that is a function of the average particulate filter catalyst temperature. The calibration rate ranges from 0.5 to 1.5 and commences whenever regeneration has been triggered and the average particulate filter catalyst temperature is within the active regeneration temperature zone. Accordingly, the hotter the average particulate filter catalyst temperature is the faster the increment will be.

In response to incrementing the net regeneration time, the net regeneration time feed forward loop 130 proceeds to step 160 of determining whether the net regeneration time is greater than a predetermined net regeneration time limit. In response to the net regeneration time being greater than the predetermined net regeneration time limit, the method proceeds to step 142 of identifying a complete regeneration and deactivating regeneration of the exhaust gas particulate filter. In response to the net regeneration time being less than or equal to the predetermined net regeneration time limit, the method returns to step 138 of incrementing the total regeneration time.

The control flag feed forward loop 136 is executed in response to the regeneration temperature target being absent from the control flag. It should now be appreciated that the regeneration temperature target may be absent from the control flag where step 126 was skipped by the low error limit feed forward loop 120 and/or where the regeneration temperature target previously set in the control flag was cleared by step 152 of the low error limit feed forward loop 120. According to the control flag feed forward loop 136, step 138 of incrementing the total regeneration time immediately follows step 132 of determining whether the control flag is set with the regeneration temperature target in response to the regeneration temperature target being absent from the control flag. In other words, the control flag feed forward loop 136 provides that the method skips step 134 of advancing the regeneration temperature target when the regeneration temperature target being absent from the control flag.

The method described herein and shown in FIGS. 3A and 3B is presented for the purpose of illustration and disclosure. As evinced by the appended claims, the method is not limited to all of the steps described herein and labeled as reference numerals 100 through 160 in FIGS. 3A and 3B. Accordingly, the method may be successfully practiced by performing only some of these steps. Additionally, the method is not limited to the order of the steps disclosed herein and illustrated in FIGS. 3A and 3B. The method may be practiced by performing these steps in an alternative order or sequence unless expressly specified otherwise in the claims. Consistent with the disclosure above, the oxidation catalyst 28 may be a diesel oxidation catalyst (DOC) and the exhaust gas particulate filter 22 may be a diesel particulate filter (DPF). The average particulate filter temperature represents the temperature of the particulate filter catalyst 30 averaged along its length. It should be appreciated that the oxidation catalyst inlet temperature, the oxidation catalyst outlet temperature, the particulate filter outlet temperature, and the average particulate filter temperature can all be measured or estimated (modeled) and may be represented in a variety of different units including, for example, degrees Celsius (C) or degree Fahrenheit (F).

The foregoing description of the embodiments has been provided for the proposes of illustration and description. It is not intended to be exhaustive of limiting. Obviously, many modifications and variations of the present disclosure are possible in light of the above teachings and may be practiced otherwise than as specifically described while within the scope of the appended claims. The use of the word "said" in the appended system claims refers to an antecedent that is a positive recitations meant to be included in the coverage of the system claims whereas the word "the" precedes a word not meant to be included in the coverage of the system claims. This convention is inapplicable to the appended method claims.

What is claimed is:

1. An exhaust treatment system comprising:
   an exhaust gas particulate filter;
   an exhaust gas oxidation catalyst in fluid communication with said exhaust gas particulate filter;
   a hydrocarbon injector supplying a dose of hydrocarbon fuel to said exhaust gas particulate filter;
   a regeneration management module controlling said hydrocarbon injector;
   said regeneration management module receiving signals indicative of an outlet temperature of said exhaust gas oxidation catalyst and an outlet temperature of said exhaust gas particulate filter;
   said regeneration management module setting a reference temperature as one of said outlet temperature of said exhaust gas oxidation catalyst and said outlet temperature of said exhaust gas particulate filter;

said regeneration management module initializing a regeneration temperature target and a closed loop temperature targeting regime that indexes said regeneration temperature target based on a profile time and said reference temperature such that said regeneration temperature target increases as a function of time and is ramped up non-linearly with time in response to a rise in said reference temperature; and said regeneration management module determining said dose of hydrocarbon fuel based on said regeneration temperature target.

2. The system of claim 1 wherein said regeneration management module determines said dose of hydrocarbon fuel by calculating a proportional hydrocarbon dosing value and an integral hydrocarbon dosing value and a derivative hydrocarbon doing value based on an exhaust mass flow, said reference temperature, and said regeneration temperature target.

3. The system of claim 2 wherein said regeneration management module sets said reference temperature as a maximum of said outlet temperature of said exhaust gas oxidation catalyst and said outlet temperature of said exhaust gas particulate filter.

4. The system of claim 3 wherein said regeneration management module determines whether said exhaust gas particulate filter is in an active regeneration temperature zone by detecting an average particulate filter catalyst temperature.

5. The system of claim 4 wherein said regeneration management module increments a total regeneration time and determines whether said total regeneration time is greater than a predetermined total regeneration time limit in response to said average particulate filter catalyst temperature being outside said active regeneration temperature zone.

6. The system of claim 5 wherein said regeneration management module identifies a complete regeneration and deactivating regeneration of said exhaust gas particulate filter in response to determining that said total regeneration time is greater than said predetermined total regeneration time limit and initiates a reiterative feedback loop in response to determining that said total regeneration time is less than or equal to said predetermined total regeneration time limit, said reiterative feedback loop returning to the step of detecting said outlet temperature of said exhaust gas oxidation catalyst and said outlet temperature of said exhaust gas particulate filter.

7. The system of claim 6 wherein said regeneration management module initiates a net regeneration time feed forward loop in response to determining that said average particulate filter temperature is within said active regeneration temperature zone, said net regeneration time feed forward loop including incrementing a net regeneration time based on said average particulate filter temperature and determining whether said net regeneration time is greater than a predetermined net regeneration time limit.

8. The system of claim 7 wherein said net regeneration time feed forward loop identifies a complete regeneration and deactivates regeneration of said exhaust gas particulate filter in response to determining that said net regeneration time is greater than said predetermined net regeneration time limit.

9. The system of claim 8 wherein said net regeneration time feed forward loop returns to incrementing said total regeneration time in response to determining that said net regeneration time is less than or equal to said predetermined net regeneration time limit.

10. A system for controlling regeneration of an exhaust gas particulate filter, comprising:

a regeneration triggering module generating a regeneration trigger state signal identifying whether regeneration of the exhaust gas particulate filter has been demanded;

a hydrocarbon injection diagnostics and system enable module generating a hydrocarbon injection enable state signal identifying whether hydrocarbon dosing is being supplied to the exhaust gas particulate filter;

a regeneration management module in communication with said regeneration triggering module and said hydrocarbon injection diagnostics and system enable module to receive said regeneration trigger state signal from said regeneration triggering module and said hydrocarbon injection enable state signal from said hydrocarbon injection diagnostics and system enable module;

said regeneration management module being programmed with a closed loop non-linear temperature targeting regime and a closed loop fuel control regime; and said regeneration management module controlling a hydrocarbon injector to selectively supply said hydrocarbon dosing to the exhaust gas particulate filter.

11. The system of claim 10 further comprising:

a signal processing module in communication with said regeneration management module, said signal processing module generating a plurality of operating parameter signals and transmitting said plurality of operating parameter signals to said regeneration management module wherein said plurality of operating parameter signals includes at least an engine percent load signal and an engine RPM signal and an oxidation catalyst inlet temperature signal and a particulate filter delta pressure signal and an exhaust back pressure signal and an average particulate filter catalyst temperature signal and an exhaust volumetric flow signal.

12. The system of claim 10 wherein said closed loop non-linear temperature targeting regime includes at least the steps of:

detecting an outlet temperature of an exhaust gas oxidation catalyst and an outlet temperature of the exhaust gas particulate filter;

setting a reference temperature as a maximum of the outlet temperature of the exhaust gas oxidation catalyst and the outlet temperature of the exhaust gas particulate filter;

initializing a regeneration temperature target and indexing the regeneration temperature target based on a profile time and the reference temperature.

13. The system of claim 12 wherein said closed loop fuel control regime includes at least the step of:

determining a dose of hydrocarbon fuel to be injected into the exhaust gas particulate filter by calculating a proportional hydrocarbon dosing value and an integral hydrocarbon dosing value and a derivative hydrocarbon doing value based on an exhaust mass flow, said reference temperature, and said regeneration temperature target.

14. The system of claim 10 wherein said regeneration management module determines whether regeneration has been interrupted based on said regeneration trigger state signal and said hydrocarbon injection enable state signal.

15. The system of claim 14 wherein said regeneration management module determines that regeneration has been interrupted in response to said regeneration trigger state signal identifying that regeneration of the exhaust gas particulate filter has been demanded and said hydrocarbon injection enable state signal identifying that hydrocarbon dosing is not being supplied to the exhaust gas particulate filter.

16. The system of claim 15 wherein said regeneration management module initiates a regeneration interruption feedback loop in response to determining that regeneration has been interrupted, said regeneration interruption feedback loop including determining whether the exhaust gas particulate filter is in an active regeneration temperature zone by detecting an average particulate filter catalyst temperature and comparing said average particulate filter catalyst temperature to said active regeneration temperature zone.

17. The system of claim 16 wherein said regeneration interruption loop decrements a net regeneration time based on said average particulate filter catalyst temperature and returns to a step of initiating regeneration of the exhaust gas particulate filter in response to determining that said average particulate filter catalyst temperature is outside of said active regeneration temperature zone.

18. A method comprising:
 initiating regeneration of an exhaust gas particulate filter;
 detecting an inlet temperature of an exhaust gas oxidation catalyst and an outlet temperature of the exhaust gas oxidation catalyst and an outlet temperature of the exhaust gas particulate filter;
 setting a reference temperature as a maximum of the inlet temperature of the exhaust gas oxidation catalyst and the outlet temperature of the exhaust gas oxidation catalyst and the outlet temperature of the exhaust gas particulate filter;
 initializing a regeneration temperature target and indexing the regeneration temperature target based on a profile time and the reference temperature;
 determining at least one hydrocarbon dosing value based on an exhaust mass flow and the reference temperature and the regeneration temperature target; and
 controlling a hydrocarbon injector to deliver a dose of hydrocarbon fuel to the exhaust gas particulate filter that corresponds to the at least one hydrocarbon dosing value.

19. The method of claim 18 further comprising:
 determining whether the regeneration temperature target was previously initialized in response to completing the step of setting the reference temperature;
 skipping the step of initializing the regeneration temperature target in response to determining that the regeneration temperature target was previously initialized; and
 executing the step of initializing the regeneration temperature target in response to determining that the regeneration temperature target was not previously initialized.

20. The method of claim 18 further comprising:
 detecting a regeneration trigger state identifying whether regeneration of the exhaust gas particulate filter has been demanded and a hydrocarbon injection enable state identifying whether hydrocarbon dosing is being supplied to the exhaust gas particulate filter;
 determining whether regeneration has been interrupted wherein regeneration is determined to be interrupted in response to the regeneration trigger state identifying that regeneration of the exhaust gas particulate filter has been demanded and the hydrocarbon injection enable state identifying that hydrocarbon dosing is not being supplied to the exhaust gas particulate filter; and
 initiating a regeneration interruption feedback loop in response to determining that regeneration has been interrupted.

21. The method of claim 20 wherein the regeneration interruption feedback loop include the steps of:
 detecting an average particulate filter catalyst temperature;
 determining whether the exhaust gas particulate filter is within an active regeneration temperature zone wherein the exhaust gas particulate filter is determined to be outside the active regeneration temperature zone in response to the average particulate filter catalyst temperature falling outside the active regeneration temperature zone;
 decrementing a net regeneration time based on the average particulate filter catalyst temperature in response to determining that the exhaust gas particulate filter is in an active regeneration temperature zone; and
 returning to the step of initiating regeneration of the exhaust gas particulate filter in response to decrementing the net regeneration time.

22. The method of claim 18 further comprising:
 calculating a temperature error by subtracting the reference temperature from the regeneration temperature target;
 calculating a temperature error low limit by multiplying the regeneration temperature target by a predetermined minimum limit factor;
 calculating a temperature error high limit by multiplying the regeneration temperature target by a predetermined maximum limit factor;
 determining whether the temperature error is greater than the temperature error low limit;
 initiating a low error limit feed forward loop in response to the temperature error being greater than the temperature error low limit;
 determining whether the temperature error is less than the temperature error high limit in response to the temperature error being less than the temperature error high limit;
 initiating a high error limit feed forward loop in response to the temperature error being less than the temperature error high limit;
 setting the regeneration temperature target in a control flag in response to the temperature error being greater than or equal to the temperature error high limit;
 detecting an average particulate filter catalyst temperature; and
 determining whether the exhaust gas particulate filter is within an active regeneration temperature zone wherein the exhaust gas particulate filter is determined to be within the active regeneration temperature zone in response to the average particulate filter catalyst temperature falling within the active regeneration temperature zone.

23. The method of claim 22 wherein the low error limit feed forward loop includes the steps of:
 clearing any regeneration temperature target previously set in the control flag; and
 returning to the step of determining whether the exhaust gas particulate filter is within an active regeneration temperature zone.

24. The method of claim 23 wherein the high error limit feed forward loop includes the steps of:
 detecting an inlet temperature of the oxidation catalyst;
 determining whether the inlet temperature of the oxidation catalyst is greater than the regeneration temperature target;
 re-indexing the regeneration temperature target based on the profile time and the reference temperature and returning to the step of setting the regeneration temperature target in a control flag in response to the inlet temperature of the oxidation catalyst being greater than the regeneration temperature target; and
 clearing any regeneration temperature target previously set in the control flag and returning to the step of determining whether the exhaust gas particulate filter is within an active regeneration temperature zone in response to the inlet temperature of the oxidation catalyst being less than or equal to the regeneration temperature target.

25. The method of claim 24 further comprising:

initiating a net regeneration time feed forward loop in response to the average particulate filter catalyst temperature being within the active regeneration temperature zone;

determining whether the control flag is set with the regeneration temperature target in response to the average particulate filter catalyst temperature being outside the active regeneration temperature zone;

advancing the regeneration target temperature by incrementing a total regeneration time by adding a value of one to the profile time in response to the control flag being set with the regeneration temperature target;

skipping the step of advancing the regeneration target temperature in response to the regeneration temperature target being absent from the control flag;

incrementing the total regeneration time;

determining whether the total regeneration time is greater than a predetermined total regeneration time limit;

initiating a reiterative feedback loop in response to determining that the total regeneration time is less than or equal to the predetermined total regeneration time limit, the reiterative feedback loop repeating the method by returning to the step of detecting the outlet temperature of the exhaust gas oxidation catalyst and the outlet temperature of the exhaust gas particulate filter; and identifying a complete regeneration and deactivating regeneration of the exhaust gas particulate filter in response to determining that the total regeneration time is greater than the predetermined total regeneration time limit.

26. The method of claim 25 wherein the net regeneration time feed forward loop includes the steps of:

incrementing a net regeneration time;

determining whether the net regeneration time is greater than a predetermined net regeneration time limit;

returning to the step of incrementing the total regeneration time in response to the net regeneration time being less than or equal to the predetermined net regeneration time limit; and identifying a complete regeneration and deactivating regeneration of the exhaust gas particulate filter in response to determining that the net regeneration time is greater than the predetermined net regeneration time limit.

* * * * *